United States Patent [19]

Nakamura

[11] Patent Number: 5,079,584
[45] Date of Patent: Jan. 7, 1992

[54] CAMERA WITH BATTERY AND CONDENSER OR CAPACITOR

[75] Inventor: Takaya Nakamura, Tokyo, Japan

[73] Assignee: Asahi Kogaku Kogyo Kabushiki Kaisha, Tokyo, Japan

[21] Appl. No.: 537,983

[22] Filed: Jun. 13, 1990

[30] Foreign Application Priority Data

Jun. 23, 1989 [JP] Japan .................................. 1-73675[U]

[51] Int. Cl.⁵ .................... G03B 15/05; G03B 17/02
[52] U.S. Cl. ................. 354/484; 354/149.11; 354/288
[58] Field of Search .................. 354/484, 149.11, 288

[56] References Cited

U.S. PATENT DOCUMENTS 4,645,325 2/1987 Inoue et al. .................. 354/484
4,863,812 9/1989 Ueda et al. .................. 429/9

FOREIGN PATENT DOCUMENTS 61-278830 12/1986 Japan .................. 354/149.11

Primary Examiner—Michael L. Gellner
Attorney, Agent, or Firm—Sandler, Greenblum & Bernstein

[57] ABSTRACT

A camera having a battery which has a recess on one side face thereof and a capacitor, wherein the capacitor is closely opposed to the recess of the battery.

18 Claims, 3 Drawing Sheets

CAMERA WITH BATTERY AND CONDENSER OR CAPACITOR

BACKGROUND OF THE INVENTION

1. Field of the Invention

The present invention relates to a camera having a battery and a condenser (capacitor) incorporated therein.

2. Description of Related Art

Recently manufactured cameras usually have a strobe incorporated therein, which uses a battery as the power source. A power source is necessary, not only for the strobe, but also for power zooming, auto-focusing, photometering, object distance measuring, etc. Accordingly, a high power battery and a condenser for the strobe are provided in almost all cameras. Such a high power camera battery is usually a lithium battery (pack battery) which has positive (+) and negative (−) electrodes (terminals) provided on one end face thereof and which has a generally elliptical cross sectional shape. The lithium battery is provided on one side thereof with a recess, and a battery chamber of the camera in which the battery is housed is provided with a projection corresponding to the recess in the battery. The battery is inserted into the battery chamber, so that the projection of the battery chamber is fitted into the recess of the battery to prevent a misconnection. The strobe condenser is generally of circular-cylindrical shape.

In a conventional camera, no particular attention is focused on the shape of the lithium battery and the condenser, in term of forming an arrangement for an accommodation space therefor.

SUMMARY OF THE INVENTION

The primary object of the present invention is to provide a camera having a lithium battery and a cylindrical condenser received therein, in which the space for receiving the battery and the condenser is minimized. Although the term condenser is used herein, it is noted that the term condenser is simply an alternate for the term "capacitor", as noted in line 6 on this page above. Accordingly, wherever the word condenser is used, it could be capacitor, and vice versa.

The present invention relates to the recess which is usually formed on one side face of the lithium battery, and to the circular-cylindrical shape of the condenser. Namely, the improvement is directed to an arrangement of the condenser closely opposed to the recess of the battery to reduce the amount space needed for accommodating the battery and the condenser, thereby to realize a small camera.

To achieve the object mentioned above, according to the present invention, a camera is provided having a battery which has a recess on one side face thereof and a condenser, wherein the condenser is opposed to the recess of the battery in the vicinity of the latter.

Preferably, the battery has a generally elliptical shape in cross section, so that the recess is formed on one side of the battery extending along a major axis of ellipse, and the condenser is generally circular-cylindrical shape.

Preferably, the camera has a grip portion in which the condenser and the battery are received, so that the longitudinal axes thereof extend in the vertical direction.

Preferably, the condenser and the battery are located in the grip portion in the vicinity of a spool chamber or a patrone chamber of the camera.

The condenser can be partially located in the recess of the battery.

The center of the condenser is located on or shifted from a center line of the battery extending in a direction perpendicular to the major axis thereof.

According to another aspect of the present invention, there is provided a camera having a grip portion which is bulges forwardly from a camera body and is located in front of a spool chamber or a patrone chamber, wherein a battery which has a recess on one side face thereof and which has a generally elliptical cross section and a cylindrical condenser are provided in the grip portion, so that the condenser can be positioned oppositely to the recess of the battery.

The grip portion in which the battery and the condenser are received can be integral with the camera body or can be detachably attached to the camera body.

According to still another aspect of the present invention, there is provided a camera having receiving chambers to receive a battery and a condenser, which chambers are connected to each other, respectively.

The provision of the battery and the condenser in the respective receiving chambers of the camera body, so that the condenser is closely opposed to the recess of the battery, makes it possible to achieve a compact and small camera.

BRIEF DESCRIPTION OF THE DRAWINGS

The invention will be described below in detail with reference to the accompanying drawings, in which.

DESCRIPTION OF PREFERRED EMBODIMENTS

Figure 5:
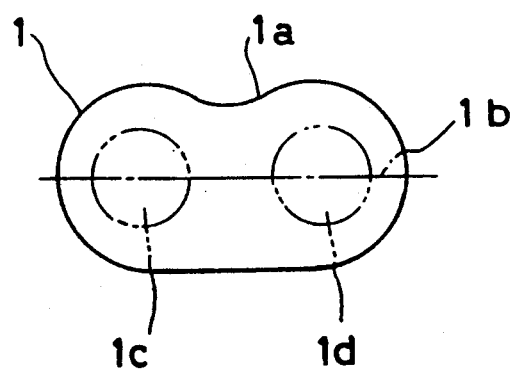
FIG. 5 is a plan view of a battery.

The lithium battery 1 which has a generally elliptical (elongated elliptical) cross section is provided on one side, extending along the major axis 1b of ellipse, with an arched recess 1a, as shown in FIG. 5. The recess 1a defines the direction of insertion of the lithium battery 1 into a battery chamber 8 of the camera 10, so that no improper connection of the positive (+) electrode 1c and the negative (−) electrode 1d, provided on one end face of the lithium battery will occur.

Figure 1:
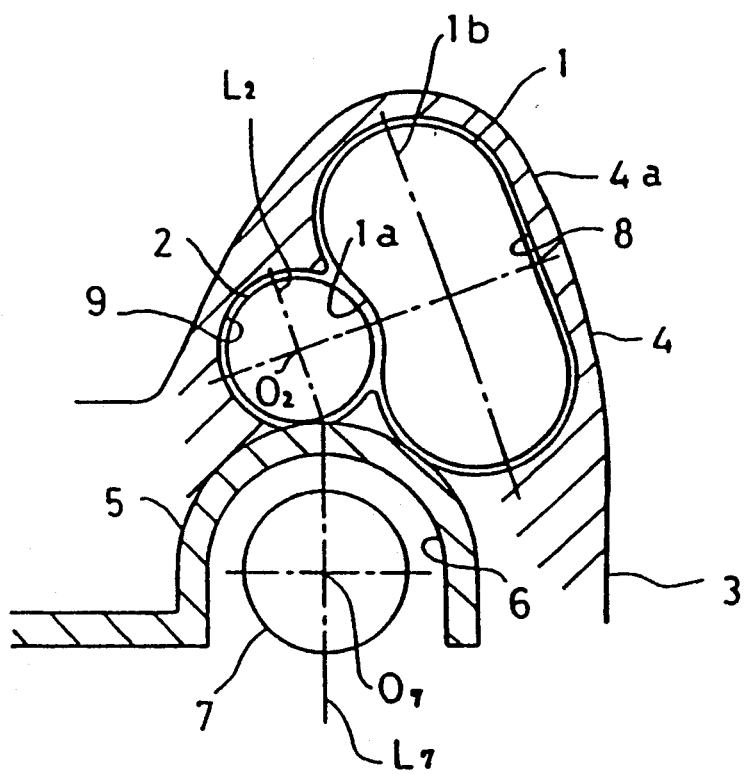
FIG. 1 is a cross sectional view of a main part of a camera having a battery and a condenser, according to the present invention.
Figure 6:
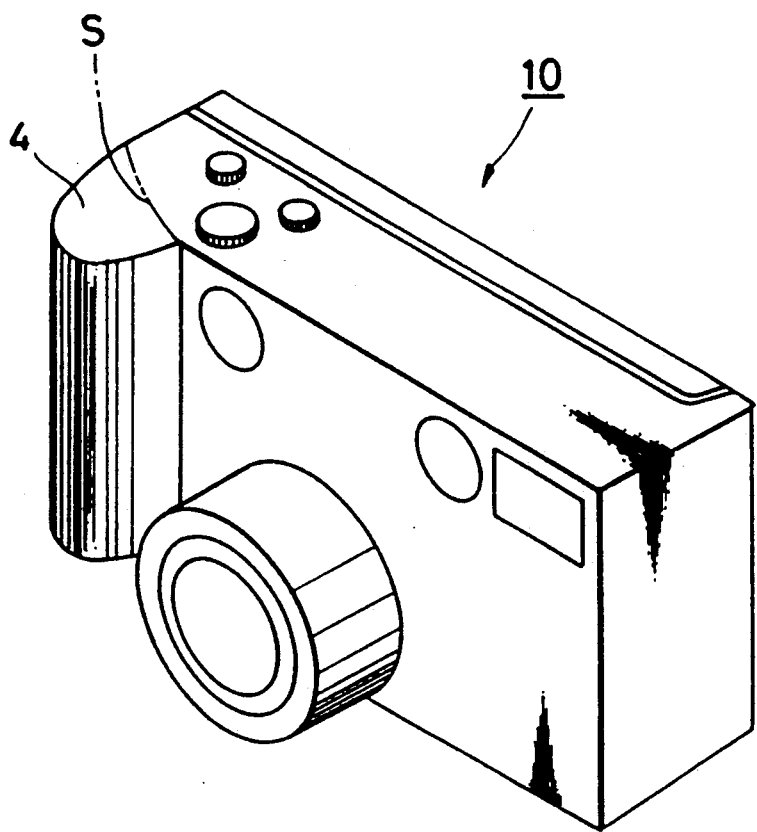
FIG. 6 is a perspective view showing one appearance of a camera according to the present invention.

As can be seen in FIGS. 1 and 6, the lithium battery 1 is received in a grip portion 4 of the camera 10 which is formed on the left hand side of the camera body, as viewed from the front of the body. The grip portion 4 of the camera 10 bulges forwardly from camera body 10. A spool chamber (or patrone chamber) 6 is formed behind the grip portion 4.

The following discussion will be directed to the positional relationship between the battery 1 and the condenser 2. When the battery 1 and the condenser 2 are inserted in the grip portion 4 of the camera 10, the condenser 2 is located oppositely to the recess 1a of the lithium battery 1, in the vicinity thereof. In the arrangement illustrated in FIG. 2, the center $O_2$ of the condenser 2 is located on the center line $L_1$ of the recess 1a of the lithium battery 1.

Figure 2:
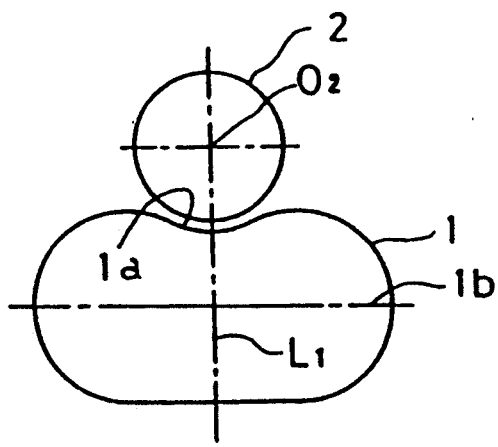
FIG. 2 is a plan view showing a positional arrangement of the battery and a condenser as shown in FIG. 1.

FIG. 1 shows a camera in which the battery 1 and the condenser 2 are accommodated in the grip portion 4 of the camera body 3, in the same arrangement as that of FIG. 2.

In FIG. 1, a spool chamber 6 which is defined by a separation wall 5 is formed on the right side (as viewed in the drawing) of the camera body 3. A spool 7 which winds film is rotatably fitted in the spool chamber 6.

The grip portion 4 partially surrounds the spool chamber 6 and has a receiving portion 4a in which the battery 1 and the condenser 2 are received. The receiving portion 4a projects forwardly from the camera body 3 to have a generally triangular cross sectional shape.

The receiving portion 4a of the grip portion 4 includes a battery chamber 8 and a condenser chamber 9, which receive therein the battery 1 and the condenser 2, respectively. The battery chamber 8 is connected to the condenser chamber 9 to define a single receiving chamber. The battery chamber 8 and the condenser chamber 9 are located in the vicinity of the spool separation wall 5.

In the illustrated embodiment, the straight line $L_2$ which intersects the center $O_2$ of the condenser 2 in parallel with the major axis 1b of the battery 1 intersects the straight line $L_7$ which in turn intersects the center $O_7$ of the spool 7 and extends in the forward and backward directions of the camera body, substantially at a point located on the outer peripheral surface of the separation wall 5 of the spool 7.

In the above-mentioned arrangement, since the condenser 2 is opposed to the recess 1a of the battery 1 to be close to each other, so that the condenser 2 can be partially located in the recess 1a of the battery and since both the battery 1 and the condenser 2 are close to the separation wall 5 of the spool 7, the space needed for accommodating the lithium battery 1 having its elongated elliptical cross section and the cylindrical condenser 2 can be minimized. This reduces the gripping surface area of the grip portion 4 with a photographer's hand, resulting in an easy grip operation and a smaller camera body.

Figure 3:
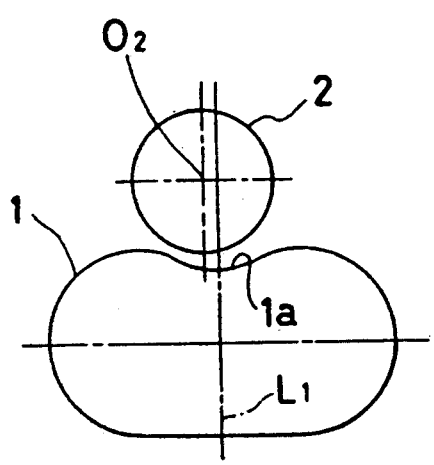
FIGS. 3 and 4 are plan views showing different positional arrangements of a battery and a condenser, according to the present invention.
Figure 4:
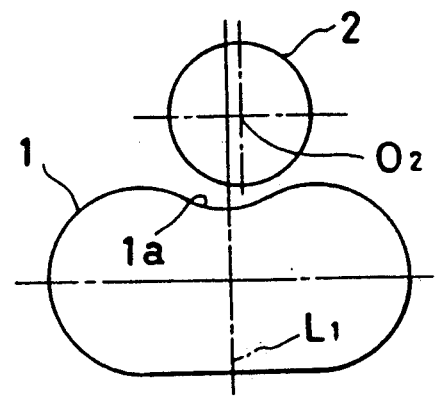

FIGS. 3 and 4 show different arrangements of the battery 1 and the condenser 2.

In an arrangement shown in FIG. 3, the center $O_2$ of the condenser 2 is slightly deviated left from the center line $L_1$ of the recess 1a of the battery 1, unlike the arrangement shown in FIG. 2.

In an arrangement shown in FIG. 4, the center $O_2$ of the condenser 2 is slightly deviated right from the center line $L_1$ of the recess 1a of the battery 1.

Although the grip portion 4 is integral with the camera body in the above-mentioned embodiments, the present invention can be also applied to a camera which has a grip detachably attached to the camera body. A chain line S shown in FIG. 6 shows a detaching line to detach the grip from the camera body, for example.

I claim:

1. A camera having a battery, said battery having a recess on one side face thereof, and a capacitor, wherein said capacitor is positioned closely to the recess of said battery.

2. A camera according to claim 1, wherein said battery has a generally elliptical shape in cross section, said recess being located on a side of said battery which extends along a major axis of said elliptical shape.

3. A camera according to claim 2, wherein the center of said capacitor is located on a center line of said battery extending in a direction perpendicular to said major axis of said battery.

4. A camera according to claim 3, wherein the center of the recess of said battery is located on the center line of said battery extending perpendicular to said major axis of said battery.

5. A camera according to claim 2, wherein the center of said capacitor is offset from a center line of said battery extending perpendicular to said major axis of said battery.

6. A camera according to claim 1, wherein said capacitor is generally circular or cylindrical in shape.

7. A camera according to claim 1, wherein the camera has a grip portion in which the capacitor and the battery are received.

8. A camera according to claim 7, wherein said capacitor and said battery are located in said grip portion, wherein longitudinal axes of said battery and capacitor extend in a vertical direction.

9. A camera according to claim 8, said camera having a spool chamber, wherein said capacitor and said battery are located in said grip portion in the vicinity of said spool chamber of said camera.

10. A camera according to claim 8, wherein the capacitor is partially located in the recess of the battery.

11. A camera having a grip portion which bulges forwardly from a camera body and which is located in front of a spool chamber, wherein a battery which has a recess on one side face of said battery, and which has a generally elliptical cross section, and a cylindrical capacitor, are provided in said grip portion, wherein the capacitor is oppositely positioned with respect to the recess.

12. A camera according to claim 11, wherein said grip portion is located from the left side of said camera body, as viewed from the front of said body.

13. A camera according to claim 12, wherein the grip portion is detachably attached to the camera body.

14. A camera having a battery chamber which receives a battery and a capacitor chamber which receives a capacitor, wherein said battery chamber and said capacitor chamber form a single chamber, said battery having a recess on one side face of said battery, said battery having a generally elliptical cross-section.

15. A camera according to claim 14, wherein said battery chamber and said capacitor are located in a grip portion of said camera, said grip portion bulging forwardly of a spool chamber of the camera.

16. A camera according to claim 14, wherein said capacitor is cylindrical and is oppositely disposed with respect to said recess of said battery in said grip portion.

17. A camera according to claim 15, wherein the capacitor is partially located in the recess of the battery.

18. A camera according to claim 14, wherein the battery is a lithium battery.

* * * * *